US012411883B2

(12) United States Patent
Kawakami et al.

(10) Patent No.: US 12,411,883 B2
(45) Date of Patent: Sep. 9, 2025

(54) INFORMATION PROCESSING SYSTEM, INFORMATION PROCESSING METHOD, AND RECORDING MEDIUM IN WHICH INFORMATION PROCESSING PROGRAM IS STORED

(71) Applicant: SHARP KABUSHIKI KAISHA, Osaka (JP)

(72) Inventors: Hiroko Kawakami, Osaka (JP); Yuichiro Koizumi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/586,542

(22) Filed: Feb. 26, 2024

(65) Prior Publication Data

US 2024/0289373 A1  Aug. 29, 2024

(30) Foreign Application Priority Data

Feb. 27, 2023 (JP) ................................ 2023-028118

(51) Int. Cl.
*G06F 7/00* (2006.01)
*G06F 16/355* (2025.01)
*G06F 18/2132* (2023.01)
*G06F 18/2431* (2023.01)

(52) U.S. Cl.
CPC ...... *G06F 16/355* (2019.01); *G06F 18/21322* (2023.01); *G06F 18/2431* (2023.01)

(58) Field of Classification Search
CPC ............. G06F 16/355; G06F 18/21322; G06F 18/2431
USPC .................................................. 707/600–899
See application file for complete search history.

(56) References Cited

U.S. PATENT DOCUMENTS 6,389,436 B1 * 5/2002 Chakrabarti .......... G06F 16/382
707/E17.097
2023/0049418 A1 * 2/2023 Saha .................... G06N 3/0464

FOREIGN PATENT DOCUMENTS

JP    2005-316897 A    11/2005

* cited by examiner

*Primary Examiner* — Isaac M Woo
(74) *Attorney, Agent, or Firm* — ScienBiziP, P.C.

(57) ABSTRACT

An information processing system includes: an acquisition processing unit that acquires a plurality of pieces of data to be classified; a classification processing unit that classifies the plurality of pieces of data acquired by the acquisition processing circuit into a plurality of groups, extracts a feature element representing a feature of a group for each of the plurality of classified groups, and generates a classification map in which the feature element is displayed in association with the group; a reception processing unit that receives an operation of selecting the predetermined feature element in the classification map from a user; and an update processing unit that executes processing of changing the group based on the feature element selected by the user and updates the classification map.

12 Claims, 11 Drawing Sheets

FIG. 2

| ID | TEXT |
|---|---|
| 0001 | POWER SUPPLY OF DEVICE DOES NOT POWER ON. |
| 0002 | PLEASE EXCHANGE PART. |
| 0003 | PLEASE EXPLAIN HOW TO OPERATE. |
| 0004 | SQUEAKING NOISE IS HEARD FROM DEVICE. |
| 0005 | PLEASE REFUND ME MONEY. |
| 0006 | OPERATION HAS STOPPED AND DOES NOT WORK. |
| ... | ... |

FIG. 14

| ID | TEXT | LABEL NAME |
|---|---|---|
| 0001 | POWER SUPPLY OF DEVICE DOES NOT POWER ON. | POWER SUPPLY |
| 0002 | PLEASE EXCHANGE PART. | EXCHANGE |
| 0003 | PLEASE EXPLAIN HOW TO OPERATE. | OPERATION |
| 0004 | SQUEAKING NOISE IS HEARD FROM DEVICE. | NOISE |
| 0005 | PLEASE REFUND ME MONEY. | REFUND |
| 0006 | OPERATION HAS STOPPED AND DOES NOT WORK. | STOP |
| ... | ... | ... |

INFORMATION PROCESSING SYSTEM, INFORMATION PROCESSING METHOD, AND RECORDING MEDIUM IN WHICH INFORMATION PROCESSING PROGRAM IS STORED

INCORPORATION BY REFERENCE

This application is based upon and claims the benefit of priority from the corresponding Japanese Patent Application No. 2023-028118 filed on Feb. 27, 2023, the entire contents of which are incorporated herein by reference.

BACKGROUND

The present disclosure relates to an information processing system that classify text data, an information processing method, and a recording medium in which an information processing program is recorded.

Conventionally, a technology for classifying a large amount of text data based on textual information such as frequently appearing words has been known. For example, a technology for arranging a large amount of text data on a two-dimensional surface based on content similarity has been known.

In the related art, when a large amount of text data is input, textual information including frequently appearing words is extracted, and a user assigns feature elements (labels) to the classified data. However, in the related art, the user cannot figure out the relationship between the respective classified data, and it is difficult to assign appropriate feature elements based on the overall tendency of the data.

SUMMARY

An object of the present disclosure is to provide an information processing system capable of assigning a feature element intended by a user to a classification result obtained by classifying data, an information processing method, and a recording medium in which an information processing program is recorded.

An information processing system according to an aspect of the present disclosure includes an acquisition processing unit, a classification processing unit, a reception processing unit, and an update processing unit. The acquisition processing unit acquires a plurality of pieces of data to be classified. The classification processing unit classifies the plurality of pieces of data acquired by the acquisition processing unit into a plurality of groups, extracts a feature element representing a feature of a group for each of the plurality of classified groups, and generates a classification map in which the feature element is displayed in association with the group. The reception processing unit receives an operation of selecting the predetermined feature element in the classification map from a user. The update processing unit executes processing of changing the group based on the feature element selected by the user and updates the classification map.

An information processing method according to another aspect of the present disclosure, executed by one or plurality of processors, the information processing method including: acquiring a plurality of pieces of data to be classified; classifying the plurality of pieces of data into a plurality of groups, extracting a feature element representing a feature of a group for each of the plurality of classified groups, and generating a classification map in which the feature element is displayed in association with the group; receiving an operation of selecting the predetermined feature element in the classification map from a user; and executing processing of changing the group based on the feature element selected by the user and updating the classification map.

A non-transitory computer-readable recording medium according to another aspect of the present disclosure in which an information processing program is recorded, the information processing program allowing one or a plurality of processors to execute: acquiring a plurality of pieces of data to be classified; classifying the plurality of pieces of data into a plurality of groups, extracting a feature element representing a feature of a group for each of the plurality of classified groups, and generating a classification map in which the feature element is displayed in association with the group; receiving an operation of selecting the predetermined feature element in the classification map from a user; and executing processing of changing the group based on the feature element selected by the user and updating the classification map.

According to the present disclosure, an information processing system capable of assigning a feature element intended by a user to a classification result obtained by classifying data, an information processing method, and a recording medium in which an information processing program is recorded can be provided.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram illustrating an example of text data used in the information processing system according to the embodiment of the present disclosure.

FIG. 14 is a diagram illustrating an example of a classification result output in the information processing system according to the embodiment of the present disclosure.

DETAILED DESCRIPTION

Hereinafter, embodiments of the present disclosure will be described with reference to the accompanying drawings. Note that the following embodiments are each an example in which the present disclosure is embodied, and are not intended to limit the technical scope of the present disclosure.

Information Processing System 10

Figure 1:
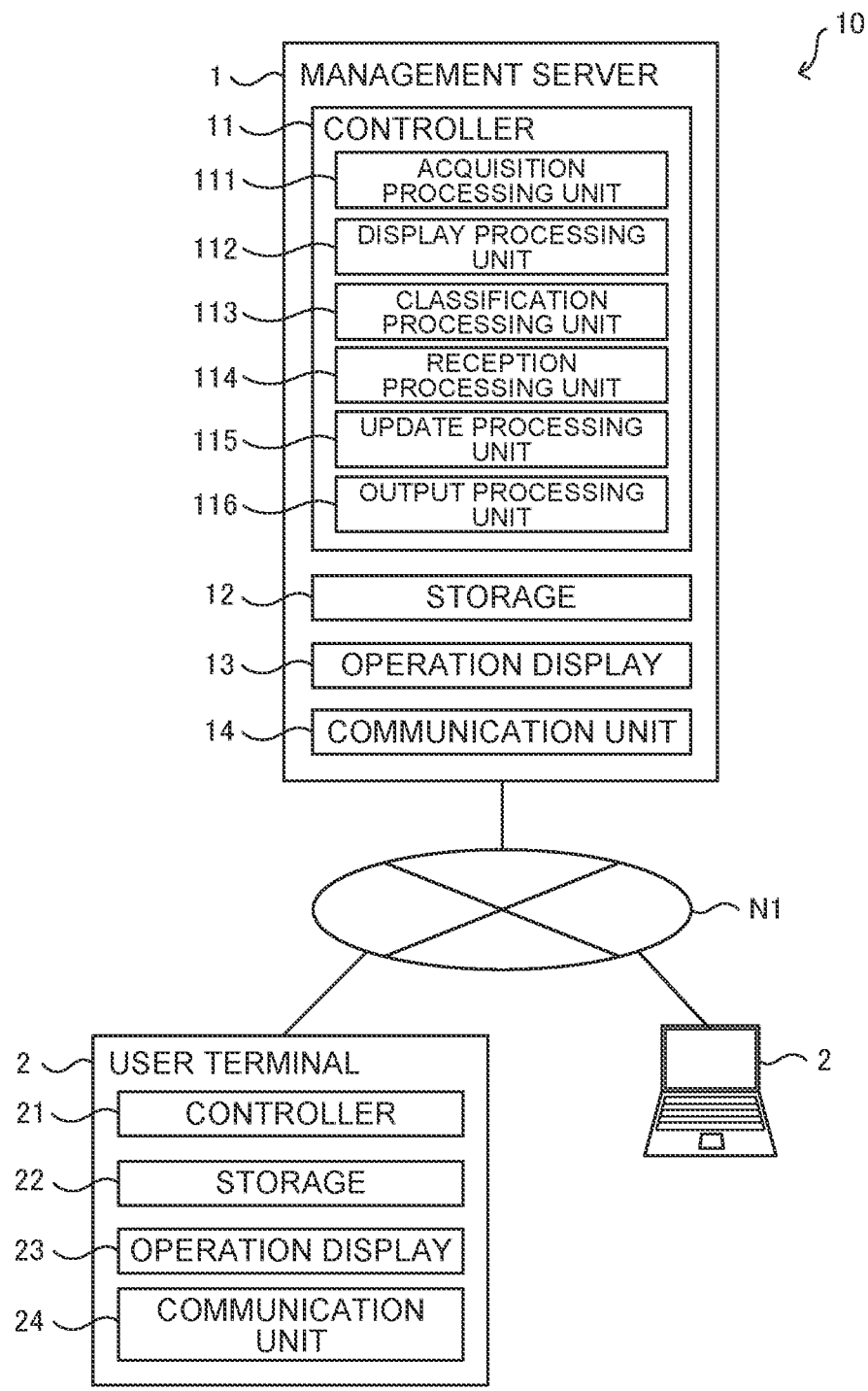
FIG. 1 is a functional block diagram illustrating a configuration of an information processing system according to an embodiment of the present disclosure.

FIG. 1 is a block diagram illustrating a configuration of an information processing system 10 according to an embodiment of the present disclosure. The information processing system 10 includes a management server 1 and a user terminal 2. The management server 1 and the user terminal 2 are connected to each other via a network N1 (for example, the Internet, a local area net work (LAN), or the like). The information processing system 10 may include a plurality of user terminals 2.

In the information processing system 10, the management server 1 manages text data (an example of data of the present disclosure) such as a document uploaded from the user terminal 2. In addition, the management server 1 manages a large amount of text data, classifies the text data in response to a request from a user, and provides a classification result to the user. In other words, the management server 1 provides the user with a data classification service of executing classification processing in response to a request from the user (classification instruction) and outputting a classification result. Note that the management server 1 may acquire text data from the user terminal 2 or another server.

For example, the management server 1 is installed into a service center that receives inquiries about products, questionnaires, repairs, and maintenance, and the plurality of user terminals 2 are installed in the service center. When a person in charge (an example of a user) of the service center receives an inquiry from a customer via a telephone or the Internet, the person in charge inputs the content of the inquiry as text in an input screen of the user terminal 2 of the person in charge. In addition, the user terminal 2 may be a terminal owned by a customer (an example of a user). In this case, the customer inputs the content of the inquiry as text in an input screen (a web page or the like) of the user terminal 2 of the customer. The text data input in each user terminal 2 is transmitted (uploaded) to the management server 1 and stored in the storage 12 of the management server 1 (see FIG. 2).

In addition, an administrator or a person in charge (an example of a user) of the service center accesses a data classification system that realizes the data classification service provided by the management server 1 in the user terminal 2 of the administrator or the person in charge, sends an instruction for classification of predetermined text data, and acquires a classification result. For example, when the administrator selects a plurality of text data to be classified and sends an instruction for classification, the management server 1 executes classification processing described below and allows the user terminal 2 to display a classification result. The administrator or the person in charge can perform a predetermined change operation (an integration operation, a reclassification operation, or the like described below) on the classification result, and the management server 1 updates the classification result in response to the change operation. The information processing system 10 according to the present disclosure can obtain the classification result intended by the user for the text data to be classified.

The information processing system 10 is an example of an information processing system of the present dis. Note that the information processing system of the present disclosure may be configured by the management server 1 alone.

Management Server 1

As illustrated in FIG. 1, the management server 1 includes a controller 11, the storage 12, an operation display 13, a communication unit 14, and the like. The management server 1 may be one or a plurality of cloud servers, or may be one or a plurality of physical servers.

The communication unit 14 is a communication interface for connecting the management server 1 by wire or wirelessly to the network N1 and executing data communication with the user terminal 2 via the network N1 in accordance with a predetermined communication protocol. The network N1 is, for example, the Internet, a local area network (LAN), or the like.

The operation display 13 is a user interface including a display unit such as a liquid crystal display or an or EL display that displays various types of information, and an operation unit such as a mouse, a keyboard, or a touch panel that receives an operation.

The storage 12 is a non-volatile storage such as a hard disk drive (HDD), a solid state drive (SSD), or a flash memory that stores various types of information. A control program such as a data classification program for allowing the controller 11 to execute data classification processing (see FIG. 15) described below is stored in the storage 12. The data classification program corresponds to a data classification application for realizing the data classification service. For example, the data classification program is temporarily recorded on a computer-readable recording medium such as a compact disc (CD) or a digital versatile disc (DVD), read by a reader (not illustrated) such as a CD drive or a DVD drive included in the management server 1, and stored in the storage 12. Note that the data classification program may be distributed from a cloud server and stored in the storage 12.

In addition, the text data acquired from the user terminal 2 is stored in the storage 12. FIG. 2 illustrates an example of text data. Identification information (ID) is assigned to each text data. When the user inputs a text in the user terminal 2, the user uploads text data to the management server 1. When acquiring the text data, the controller 11 assigns IDs to the text data in the order of acquisition and stores the text data in the storage 12. As another embodiment, the controller 11 may acquire voice data from the user terminal 2 or another information processing device, convert the voice data into text data, and store the text data in the storage 12.

Note that the text data may be registered in a data server different from the management server 1. The data server may manage the text data, and the management server 1 may access the data server to refer to the text data.

The controller 11 includes a control devices such as a CPU, a ROM, and a RAM. The CPU is a processor that executes various arithmetic operations. The ROM stores in advance a control program such as a BIOS and an OS for allowing the CPU to execute various types of processing. The RAM stores various types of information, and is used as a temporary storage memory (work area) for the various types of processing executed by the CPU. In addition, the controller 11 controls the management server 1 by allowing the CPU to execute various types of control programs stored in advance in the ROM or the storage 12.

Specifying, as illustrated in FIG. 1, the controller 11 includes various processing units such as an acquisition processing unit 111, a display processing unit 112, a classification processing unit 113, a reception processing unit 114, an update processing unit 115, and an output processing unit 116. Note that the controller 11 executes various types of processing in accordance with the data classification program and thereby functions as the various processing units. In addition, some or all of the processing units included in the controller 11 may be configured by electronic circuits. Note that the data classification program may be a program for allowing a plurality of processors to function as the various processing units.

The acquisition processing unit 111 acquires text data. Specifically, when the user inputs a document (text) in the user terminal 2 and performs an upload operation, the acquisition processing unit 111 acquires text data of the document. Addition, the acquisition processing unit 111 may acquire text data by converting voice data into text. Note that the text data may be input in a web application (data classification application) provided by the management server 1, or may be input in a data classification application installed in the user terminal 2. The acquisition processing unit 111 assigns an ID to each of the acquired text data and stores the text data in the storage 12 (see FIG. 2).

Additionally, the acquisition processing unit 111 acquires a plurality of text data to be classified. For example, the acquisition processing unit 111 acquires, from a large amount of text data stored in the storage 12, a plurality of text data to be classified, which are selected by the user.

Figure 3:
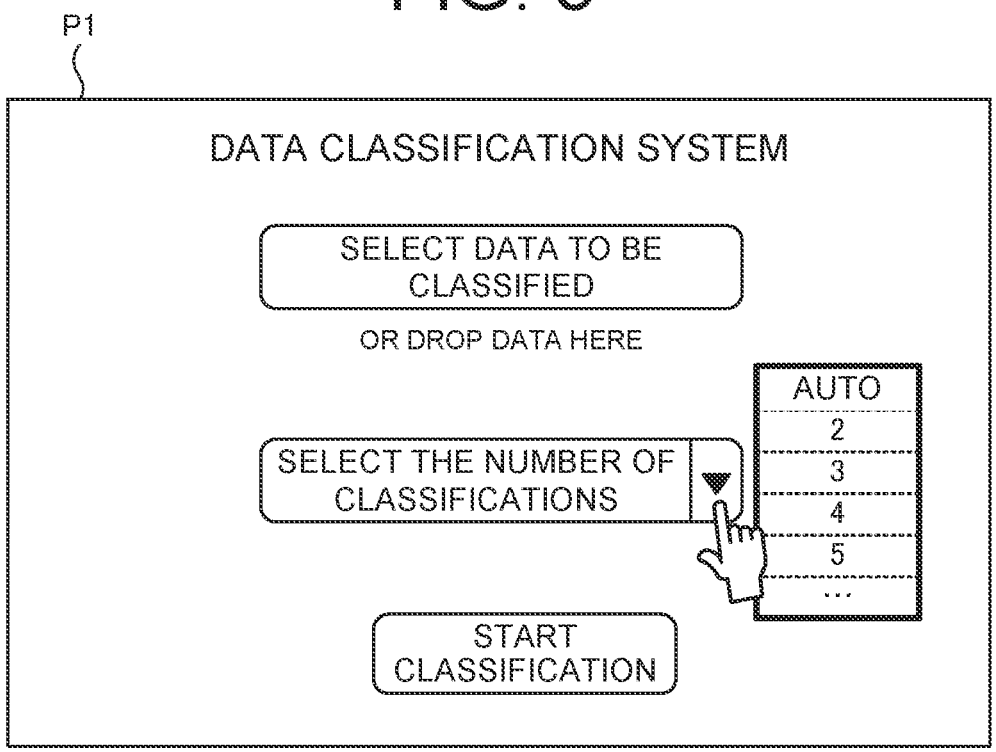
FIG. 3 is a diagram illustrating an example of an operation screen displayed on a user terminal according to the embodiment of the present disclosure.

The display processing unit 112 allows the user terminal 2 to display various types of information. For example, the display processing unit 112 allows the user terminal 2 to display an operation screen P1 of the data classification system. In addition, for example, the display processing unit 112 allows the user terminal 2 to display a scattering diagram P2 (an example of a classification map of the present disclosure) in which the text data is two-dimensionally arranged. FIG. 3 illustrates an example of the operation screen P1, and FIGS. 4 to 13 each illustrate an example of the scattering diagram P2.

When receiving a classification instruction from the user, the classification processing unit 113 executes predetermined classification processing on the plurality of text date to be classified, which are acquired by the acquisition processing unit 111.

For example, on the operation screen P1 illustrated in FIG. 3, the user selects the text data to be classified. For example, on the operation screen P1 displayed on the user terminal 2, the user causes a list of the text data stored in the storage 12 to appear and selects the desired text data, or inputs search conditions such as a period, a keyword, and a category and selects a plurality of searched text data. The acquisition processing unit 111 acquires a plurality of text data to be classified in accordance with the selection operation by the user. Subsequently, the user selects the desired number of classifications on the operation screen P1. When the user selects "Auto", the classification processing unit 113 determines the number of classifications based on the content of the selected text data. When the user selects the text data and number of classifications and then issues a classification instruction by pressing "Start Classification" on the operation screen P1, the classification processing unit 113 receives the classification instruction and executes classification processing on the text data acquired by the acquisition processing unit 111.

In the classification processing, the classification processing unit 113 classifies the plurality of text data selected by the user into a plurality of classes (an example of groups of the present disclosure), extracts a label (an example of a feature element of the present disclosure) representing a feature of the class for each of the plurality of classified classes, and generates a scattering diagram P2 in which the extracted label is displayed in association with the class.

Specifically, the classification processing unit 113 convers the text data into vector data by using a natural language model and executes, based on the vector data, classification processing of classifying the text data into a plurality of classes and dimensional compression processing of compressing the text data into two-dimensional data. For example, the classification processing unit 113 performs numerical transformation processing on the text data by using a known natural language model such as BERT or Sentence BERT to obtain, for example, 768 dimensional vector data. Next, the classification processing unit 113 classifies the vector data by using a know clustering method such as the k-means method or the x-means method (classification processing). Here, the classification processing unit 113 assigns a class number (0, 1, 2, . . . , or the like). Additionally, the classification processing unit 113 compresses, for example, the 768 dimensional vector data into two-dimensional data by using known dimensional compression processing such as t-SNE or PCA.

Figure 4:
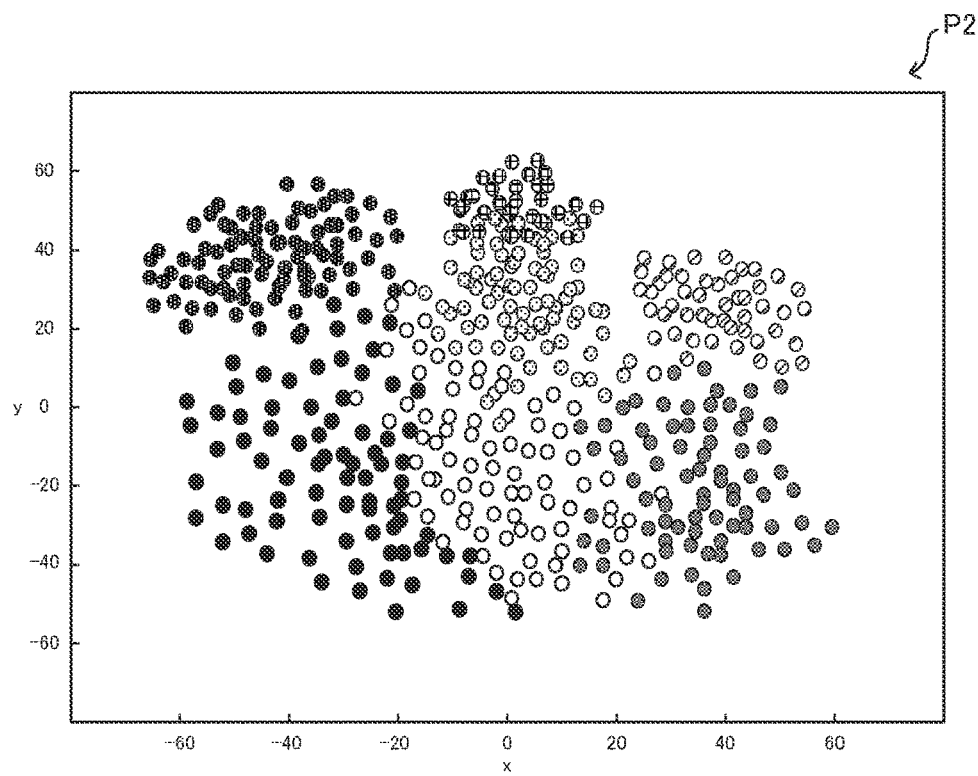
FIG. 4 is a diagram illustrating an example of a scattering diagram generated in the information processing system according to the embodiment of the present disclosure.

The classification processing unit 113 generates the scattering diagram P2 corresponding to a two-dimensional map by the classification processing and the dimensional compression processing. For example, as illustrated in FIG. 4, the classification processing unit 113 generates the scattering diagram P2 in which each of the quantified text data is plotted on a two-dimensional surface. Further, the classification processing unit 113 displays plots in different display modes (for example, different colors) for the classified classes in the scattering diagram P2.

Furthermore, the classification processing unit 113 assigns a label to each of the classes in the generated scattering diagram P2. For example, the classification processing unit 113 extracts, for each class, top five words (words) in descending order of appearance frequency from a plurality of text data included in the class. As described above, the classification processing unit 113 extracts, for each class, a word representing the feature, tendency, or the like of the class. The classification processing unit 113 displays the extracted five words in association with the class in the scattering diagram P2. In the scattering diagram P2 illustrated in FIG. 5, labels R1 to R7 respectively displayed in association with the seven classes are indicated. In each of the labels R1 to R7, five words (label candidates) are displayed.

As described above, in the scattering diagram P2, the classification processing unit 113 displays the classes in different display modes such that the classes can be identified, and displays the labels for the classes such that the labels can be identified. Thus, the user can figure out the feature, tendency, or the like of the text data to be classified with reference to the scattering diagram P2. Note that the user can set the number of words included in each label (the number of label candidates) on the operation screen P1.

Figure 5:
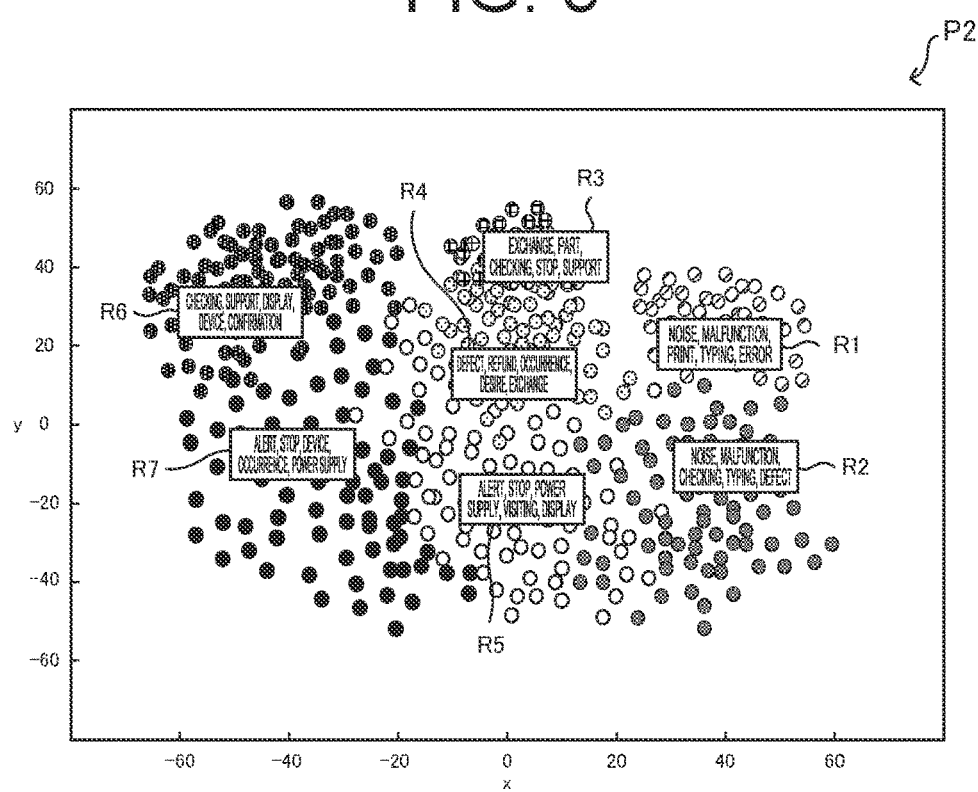
FIG. 5 is a diagram illustrating an example of a scattering diagram generated in the information processing system according to the embodiment of the present disclosure.

Here, in the scattering diagram P2 illustrated in FIG. 5, the user can perform a predetermined change operation (integration operation, reclassification operation, or the like) in the scattering diagram P2 so as to more easily figure out the feature of the text data. The reception processing unit 114 receives an operation of selecting the predetermined label from the user in the scattering diagram P2. Additionally, the update processing unit 115 executes predetermined processing (change processing) to the label selected by the user to update the scattering diagram P2.

Figure 6:
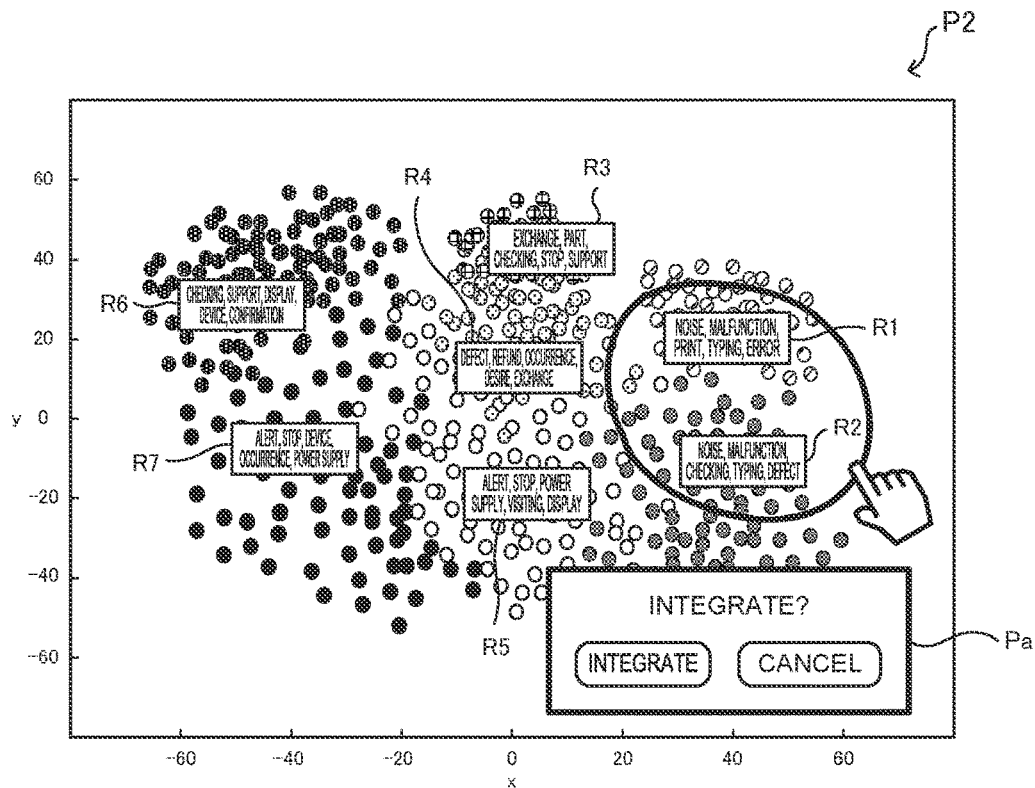
FIG. 6 is a diagram illustrating an example of a scattering diagram generated in the information processing system according to the embodiment of the present disclosure.
Figure 7:
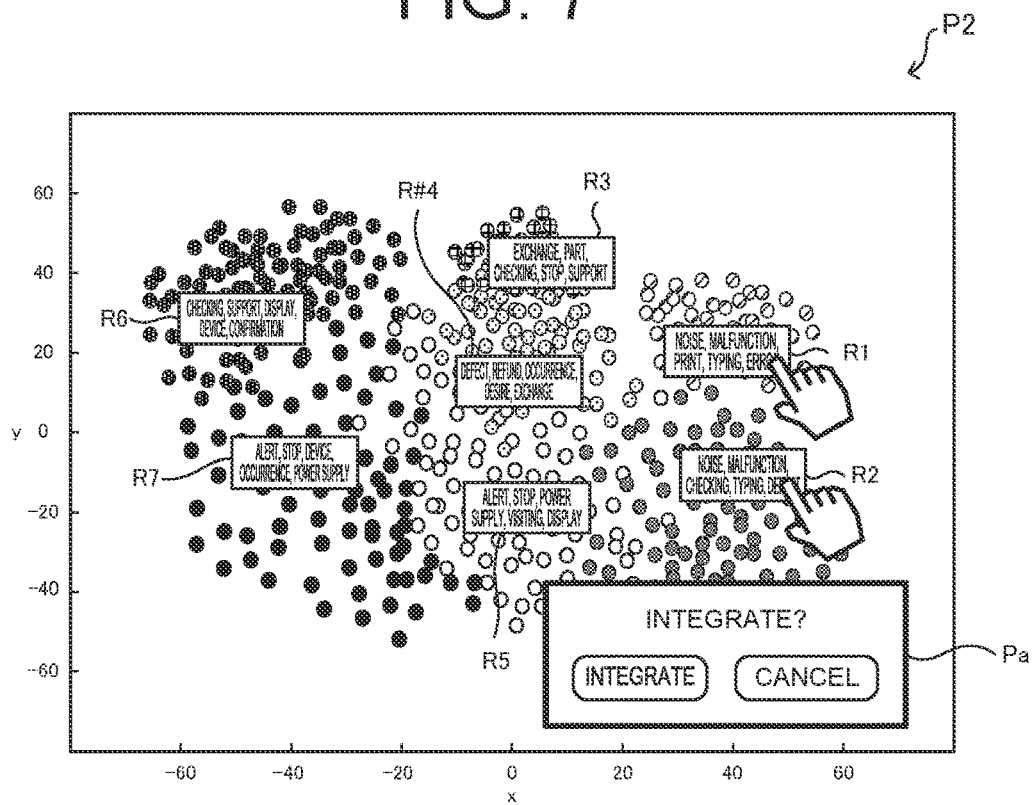
FIG. 7 is a diagram illustrating an example of a scattering diagram generated in the information processing system according to the embodiment of the present disclosure.

Specifically, in the scattering diagram P2, the reception processing unit 114 receives an integration operation of selecting a plurality of labels respectively associated with a plurality of classes and integrates the labels into one class. For example, as illustrated in FIG. 6, the user selects, in the scattering diagram P2, the plurality of labels corresponding to the plurality of classes to be integrated, that is, the labels R1 and R2 in this case. The user may select the labels R1 and R2 by surrounding the labels R1 and R2 with a mouse or a finger as illustrated in FIG. 6, or may select the labels R1 and R2 by clicking the labels R1 and R2 as illustrated in FIG. 7. When the user selects the labels R1 and R2, the reception processing unit 114 displays (pop-up displays) a screen Pa for inquiring whether to integrate the labels as illustrated in FIGS. 6 and 7. When the user presses "Integrate" on the screen Pa, the reception processing unit 114 receives the integration operation. Note that the display on the screen Pa may be omitted.

Figure 8:
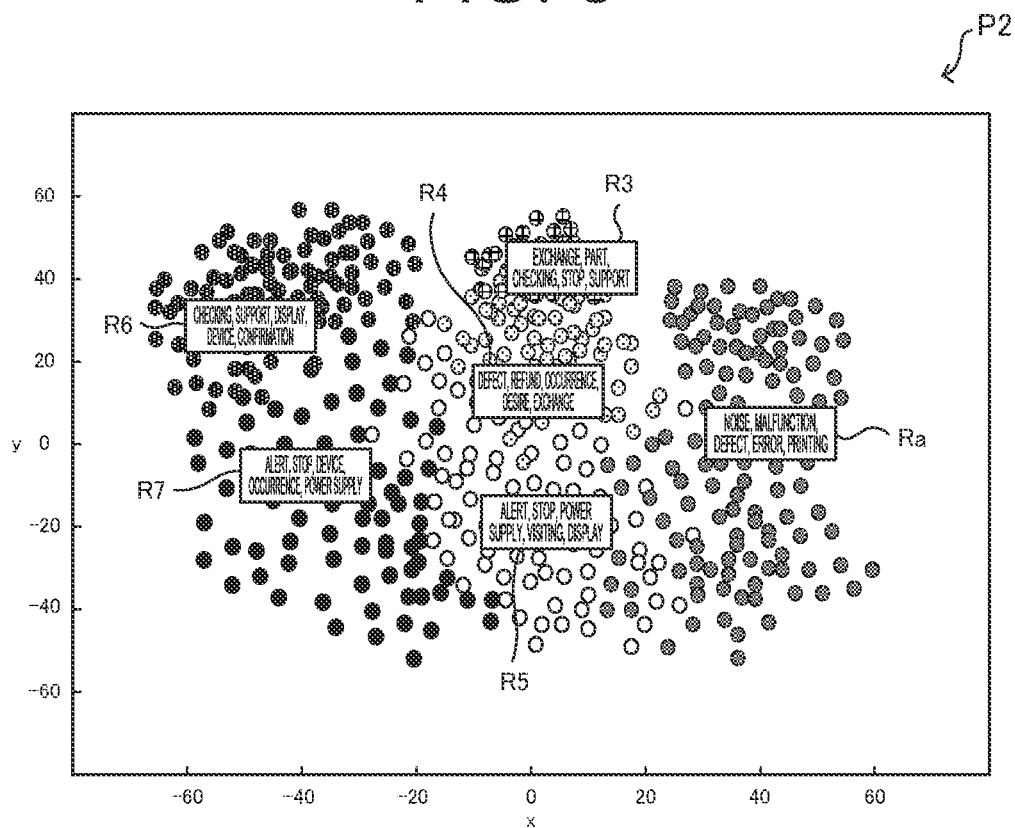
FIG. 8 is a diagram illustrating an example of a scattering diagram generated in the information processing system according to the embodiment of the present disclosure.

When the reception processing unit 114 receives the integration operation, the update processing unit 115 integrates the classes of the labels selected by the user and updates the scattering diagram P2. For example, when the user selects the labels R1 and R2 (see FIGS. 6 and 7), the update processing unit 115 extracts a new label Ra (an example of a third feature element of the present disclosure) based on the text data included in the class corresponding to the label R1 (an example of a first feature element of the present disclosure) and the text data included in the class corresponding to the label R2 (an example of a second feature element of the present disclosure), and updates the scattering diagram P2. FIG. 8 illustrates the scattering diagram P2 updated by integration processing. As illustrated in FIG. 8, the update processing unit 115 extracts, in the scattering diagram P2, five words representing features in the two classes corresponding to the labels R1 and R2, and displays the label Ra (integrated label) including the extracted words in association with one integrated class.

Note that as illustrated in FIG. 8, the update processing unit 115 may update each plot corresponding to the text data after integration (the text data of the label Ra and the text data of the label R2) to a common display mode (the same color) in the scattering diagram P2.

Figure 9:
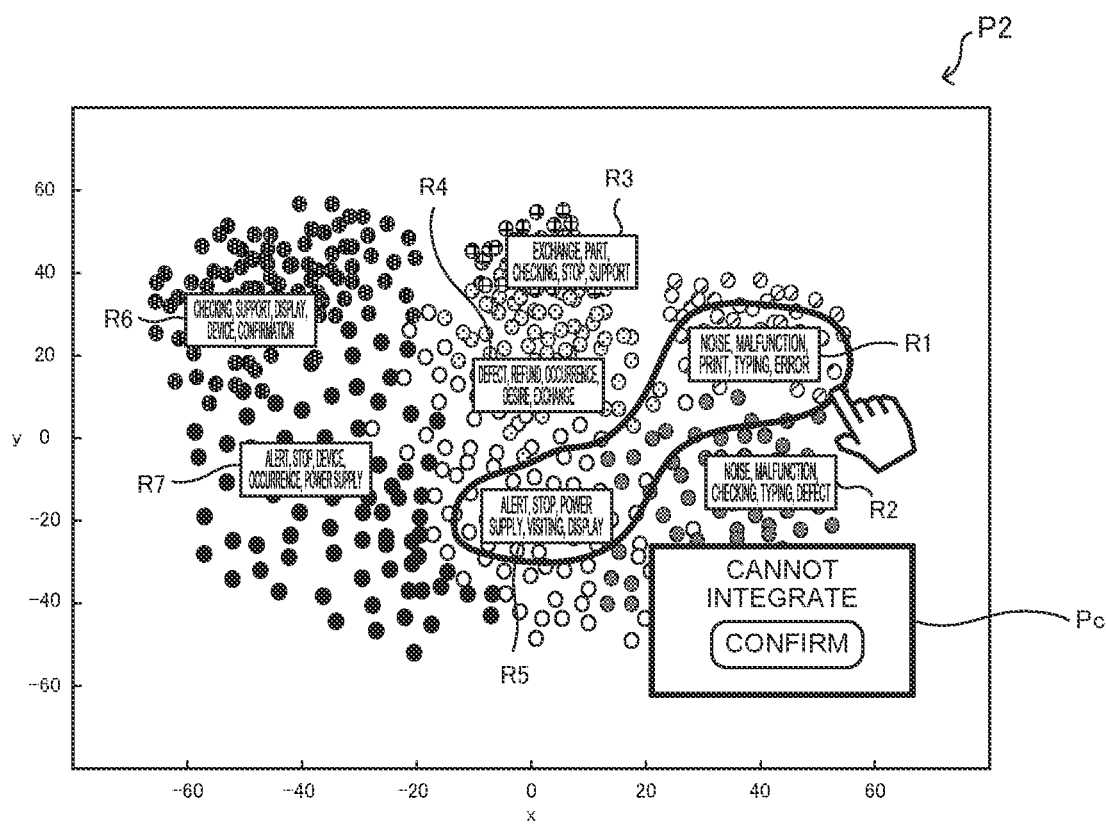
FIG. 9 is a diagram illustrating an example of a scattering diagram generated in the information processing system according to the embodiment of the present disclosure.

As another embodiment, the update processing unit 115 may execute integration processing (update processing) on the condition that a plurality of classes corresponding to a plurality of labels selected by the user are similar to each other. In other words, the update processing unit 115 may reject the integration processing (update processing) when the plurality of classes corresponding to the plurality of labels selected by the user are not similar to each other. For example, the update processing unit 115 can determine the similarity based on a distance between the plurality of labels in the scattering diagram P2. The plurality of classes have a relationship in which the closer the distance between the labels is, the more similar the classes are, and the farther the distance between the labels is, the less similar the classes are. Therefore, for example, as illustrated in FIG. 9, when the user selects the labels R1 and R5 in the scattering diagram P2, the distance between the labels R1 and R5 is equal to or greater than a predetermined distance. In such a case, the update processing unit 115 determines that the class of the label R1 and the class of the label R5 are not similar to each other, and rejects the integration processing. In addition, when the plurality of classes corresponding to the plurality of labels selected by the user are not similar to each other, the update processing unit 115 may display a message Pc (an example of warning information of the present disclosure) indicating that integration cannot be performed (see FIG. 9). As a result, the scattering diagram P2 can be prevented from being unnecessarily updated when the user performs, by incorrect operation or the like, an integration operation on labels having low relativeness.

The update processing unit 115 executes reclassification processing in addition to the integration processing. Specifically, the update processing unit 115 executes reclassification processing of reclassifying one class into a plurality of classes and updating the scattering diagram P2. For example, the update processing unit 115 receives an operation of selecting the number of classifications into which the classes are classified from the user, and reclassifies the classes into the number of classifications selected by the user.

Figure 10:
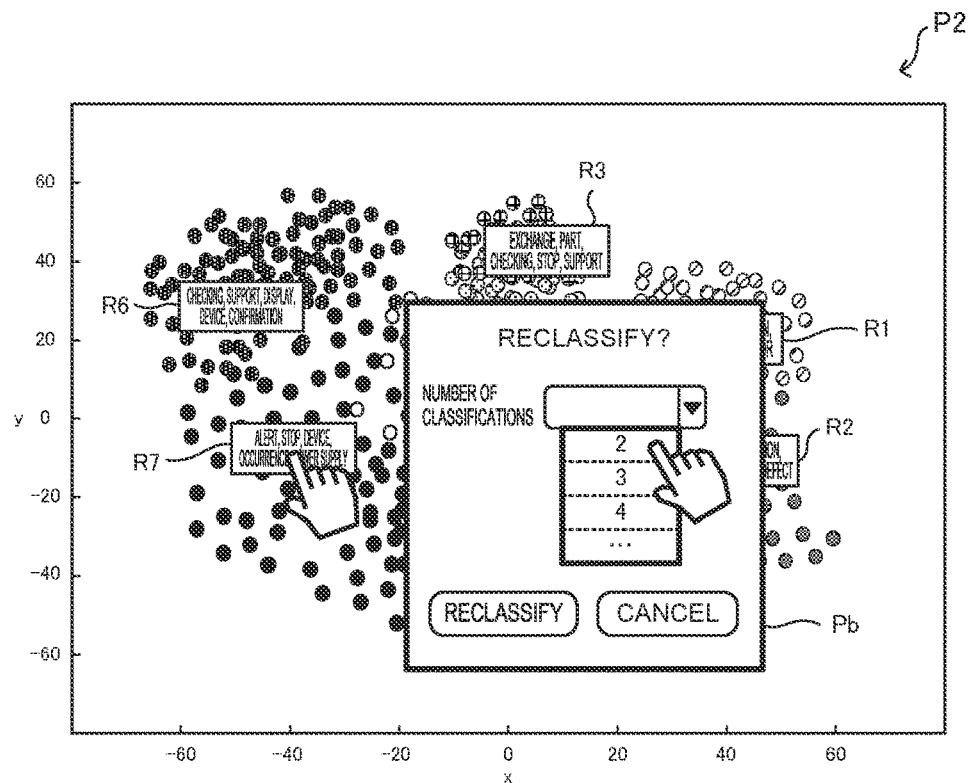
FIG. 10 is a diagram illustrating an example of a scattering diagram generated in the information processing system according to the embodiment of the present disclosure.

For example, in the scattering diagram P2, the reception processing unit 114 receives, from the user, a reclassification operation of selecting one class and reclassifying the selected class into a plurality of classes. For example, as illustrated in FIG. 10, the user selects one label to be reclassified, in this case, a label R7 in the scattering diagram P2. As illustrated in FIG. 10, the user clicks the label R7 with a mouse or a finger. When the user selects the label R7, the reception processing unit 114 displays (pop-up displays) a screen Pb on which the number of classifications is input, as illustrated in FIG. 10. When the user selects the number of classifications and presses "Reclassify" on the screen Pb, the reception processing unit 114 receives the reclassification operation. Note that the reception processing unit 114 may calculate the upper limit number of classifications based on the text data of the class corresponding to the label selected by the user, and may display the number of classifications up to the calculated upper limit number of classifications on the screen Pb in a selectable manner.

Figure 11:
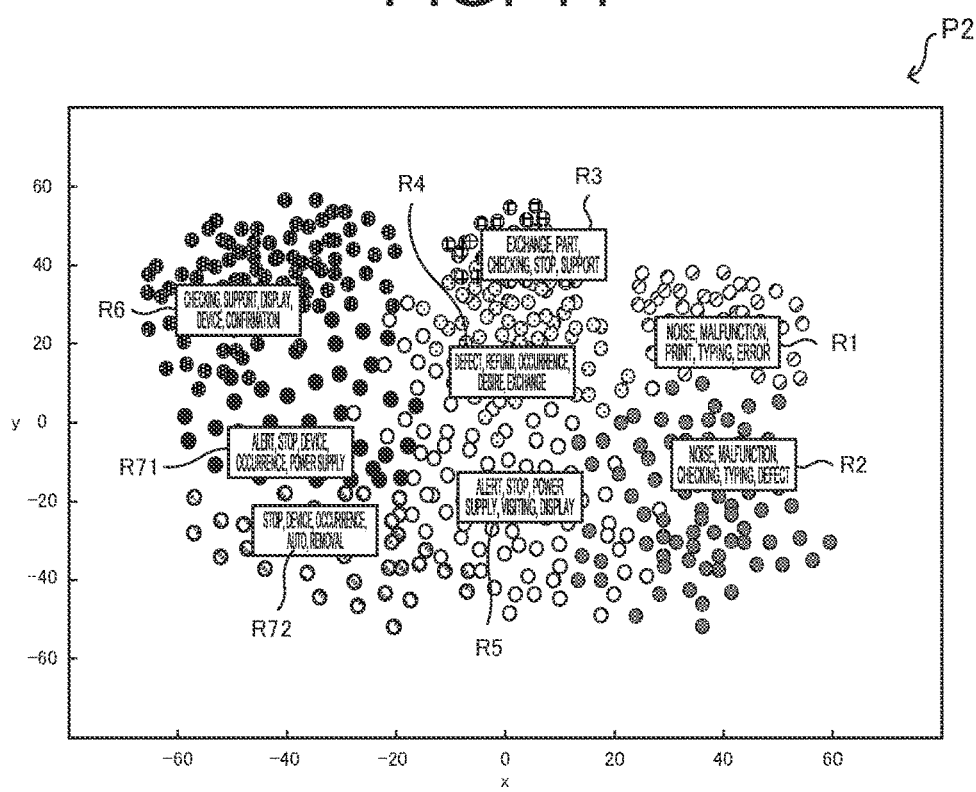
FIG. 11 is a diagram illustrating an example of a scattering diagram generated in the information processing system according to the embodiment of the present disclosure.

When the reception processing unit 114 receives the reclassification operation, the update processing unit 115 reclassifies the class corresponding to the label selected by the user and updates the scattering diagram P2. For example, when the user selects the label R7 and selects the number of classifications "2" (see FIG. 10), the update processing unit 115 extracts two new labels R71 and R72 based on the text data included in the class corresponding to the label R7 and updates the scattering diagram P2. FIG. 11 illustrates the scattering diagram P2 updated by the reclassification processing. As illustrated in FIG. 11, in the scattering diagram P2, the update processing unit 115 extracts five words representing different features corresponding to each of the two labels R71 and R72 in the text data of the class corresponding to the label R7 selected by the user, and displays the labels R71 and R72 (reclassified labels) each including the five words respectively corresponding to the features in association with each of the two reclassified classes.

Note that as illustrated in FIG. 11, the update processing unit 115 may update plots respectively corresponding to the text data after reclassification (the text data of the label R71 and the text data of the label R72) to different display modes (different colors) in the scattering diagram P2.

As another embodiment, the update processing unit 115 may reject the reclassification processing (update processing) when the similarity of the text data of the classes corresponding to the labels selected by the user is high and the text data cannot be reclassified. For example, when the distance between labels in the case of reclassification into a plurality of classes is below a predetermined distance (for example, when the labels overlap each other), the update processing unit 115 rejects the reclassification processing. In this case, the update processing unit 115 may display a message indicating that reclassification cannot be performed (not illustrated).

As described above, the controller 11 receives a change operation (integration operation, reclassification operation, or the like) for the classification result from the user in the scattering diagram P2 in which the text data is classified, and updates the scattering diagram P2 in accordance with the change operation (see FIGS. 8 and 11). Note that the controller 11 may have both functions of the integration processing and the reclassification processing and may have one of the functions.

Figure 12:
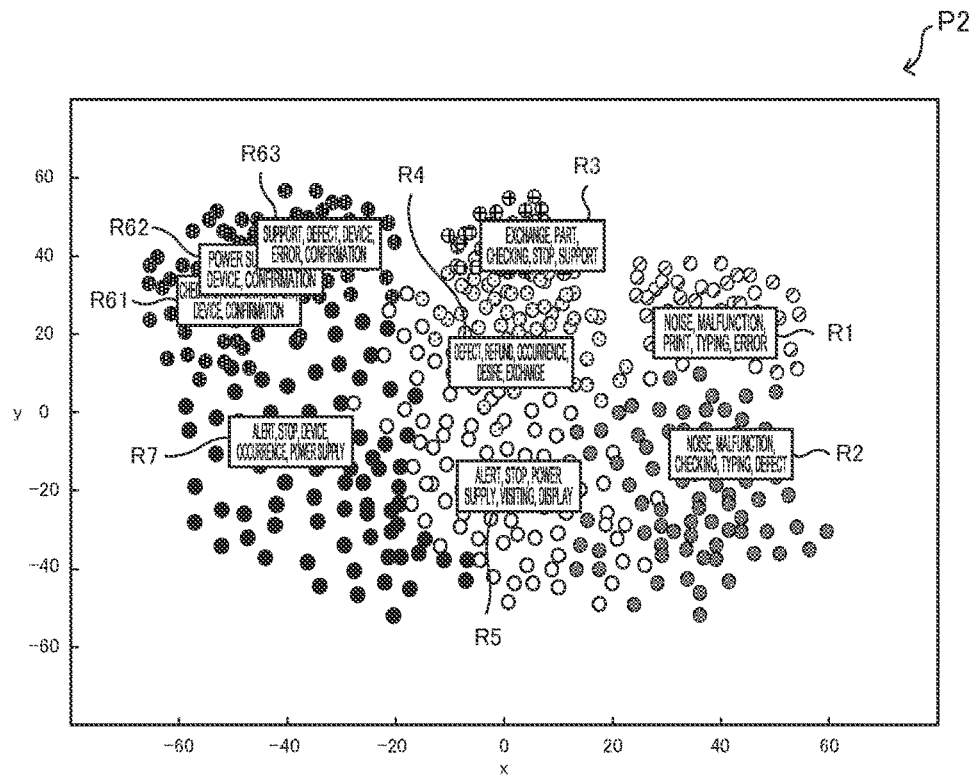
FIG. 12 is a diagram illustrating an example of a scattering diagram generated in the information processing system according to the embodiment of the present disclosure.
Figure 13:
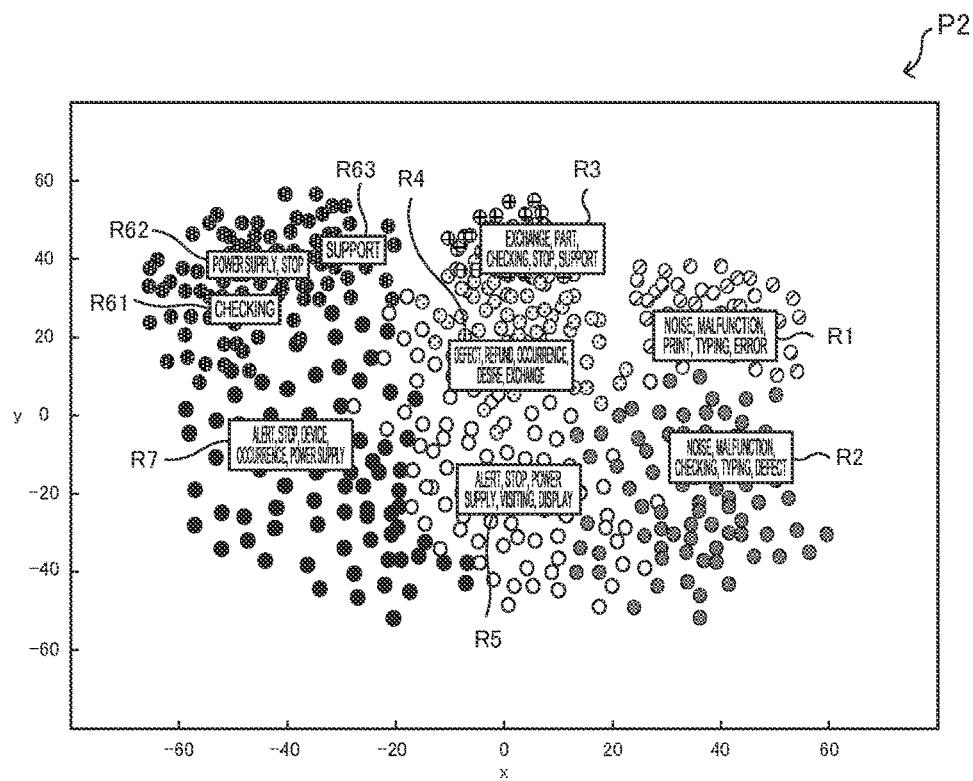
FIG. 13 is a diagram illustrating an example of a scattering diagram generated in the information processing system according to the embodiment of the present disclosure.

Here, the classification processing unit 113 may execute processing for preventing labels from being displayed in an overlapping manner when generating the scattering diagram P2. For example, as illustrated in FIG. 12, when the text data is classified, a plurality of labels R61, R62, and R63 corresponding to a plurality of classes overlap each other in the scattering diagram P2 (the labels at least partially overlap each other). In such a case, as illustrated in FIG. 13, the classification processing unit 113 reduces the number of displayed words (label candidates) in each of the labels in order to prevent overlap display. The classification processing unit 113 reduces the number of displayed words to the extent that the labels do not overlap. Note that when the contents of the labels after reduction are common, the classification processing unit 113 may add words by which the corresponding classes can be identified and display the words on the labels.

As described above, when a plurality of extracted labels overlap each other in the scattering diagram P2, the classification processing unit 113 reduces the number of displayed words (label candidates) included in each of the plurality of labels and generates the scattering diagram P2. Note that when receiving a classification instruction (see FIG. 3) from the user, the classification processing unit 113 may omit the display of the scattering diagram P2 illustrated in FIG. 12 and display the scattering diagram P2 illustrated in FIG. 13. In addition, when receiving a classification instruction from the user, the classification processing unit 113 may display the scattering diagram P2 illustrated in FIG. 12 on the user terminal 2 once, and then, when receiving an instruction to adjust the number of displayed words from the user, the classification processing unit 113 may display the scattering diagram P2 in which the number of displayed words on the label is reduced (see FIG. 13). Note that when the user selects a plurality of labels and performs the integrated operation, the classification processing unit 113 may increase the number of words on the integrated label. By executing processing of adjusting the number of words on the label, the scattering diagram P2 is easily viewable, and the user can more easily figure out the tendency of the text data.

When the classification processing is executed as described above, the output processing unit 116 allows the user terminal 2 to display the classification processing result (classification result P3). For example, as illustrated in FIG. 14, the output processing unit 116 allows the user terminal 2 to display, based on the scattering diagram P2, the classification result P3 in which the text data and the label are associated with each other. The output processing unit 116 extracts one label from a plurality of words (label candidates) included in the label and associates the label with the text data. Note that the output processing unit 116 may extract a plurality of labels from a plurality of label candidates and associate the labels with the text data. In addition, the output processing unit 116 may associate a label selected by the user from among a plurality of label candidates with the text data. The output processing unit 116 may convert the classification result P3 into CSV format data and transfer the data to the user terminal 2.

User Terminal 2

As illustrated in FIG. 1, the user terminal 2 includes a controller 21, a storage 22, an operation display 23, a communication unit 24, and the like. The user terminal 2 is, for example, an information processing device such as a personal computer, a smartphone, or a tablet terminal.

The communication unit 24 is a communication interface for connecting the user terminal 2 by wire or wirelessly to the network N1 and executing data communication via the network N1 with an external device such as the management server 1 in accordance with a predetermined communication protocol.

The operation display 23 is a user interface including a display such as a liquid crystal display or an organic EL display on which information such as various web pages is displayed, and an operation unit such as a mouse, a keyboard, or a touch panel that accepts operations.

The storage 22 is a non-volatile storage such as HDD, SSD, or flash storage that stores various types of information. For example, a control program such as a browser program is stored in the storage 22. Specifically, the browser program is a control program for allowing the controller 21 to execute communication processing with an external device such as the management server 1 in accordance with a communication protocol such as Hypertext Transfer Protocol (HTTP). In addition, the browser program may be a device application for executing the communication processing with the management server 1 in accordance with a predetermined communication protocol.

The controller 21 includes control devices such as a CPU, a ROM, and a RAM. The CPU is a processor that executes various arithmetic operations. The ROM is a non-volatile storage in which control programs such as BIOS and OS for allowing the CPU to execute various types of processing ares stored in advance. The RAM is a volatile or non-volatile storage that stores various types of information, is used as a temporary storage memory (working area) for a various types of processing executed by the CPU. In addition, the controller 21 controls the user terminal 2 by allowing the CPU to execute various control programs stored in advance in the ROM or the storage 22.

Specifically, the controller 21 functions as a browser processor by executing various types of processing in accordance with the browser program stored in the storage 22. The controller 21 allows the operation display 23 to display a web page provided from the management server 1 via the network N1 and can execute browser processing of inputting an operation for the operation display 23 into the management server 1. In other words, the browser program is executed by the controller 21, and thus the user terminal 2 can function as an operation terminal for the management server 1. Note that some or all of the processing units included in the controller 21 may be configured by electronic circuits.

In the user terminal 2, when a user operation is performed to request access to a predetermined URL corresponding to the website of a data classification service provided by the management server 1, the controller 21 acquires data of the web page of the website from the management server 1 and displays the web page on the operation display 23. Note that when a predetermined application (data classification application) corresponding to the management server 1 is installed in the user terminal 2, the user of the user terminal 2 performs an operation to start the data classification application, and thus the web page of the website is displayed on the operation display 23.

Further, the controller 21 uploads a document (text data) created in the user terminal 2 to the management server 1 in accordance with an operation by the user. Furthermore, the controller 21 transmits a classification instruction for classifying the text data (see FIG. 2) stored in the management server 1 to the management server 1 in accordance with an operation by the user.

In addition, the controller 21 allows the operation display 23 of the user terminal 2 to display web pages such as the operation screen P1 (see FIG. 3), the scattering diagram P2 (see FIGS. 4 to 13), and the classification result P3 (see FIG. 14). Moreover, the controller 21 receives an operation by the user in each page.

Data Classification Processing

Figure 15:
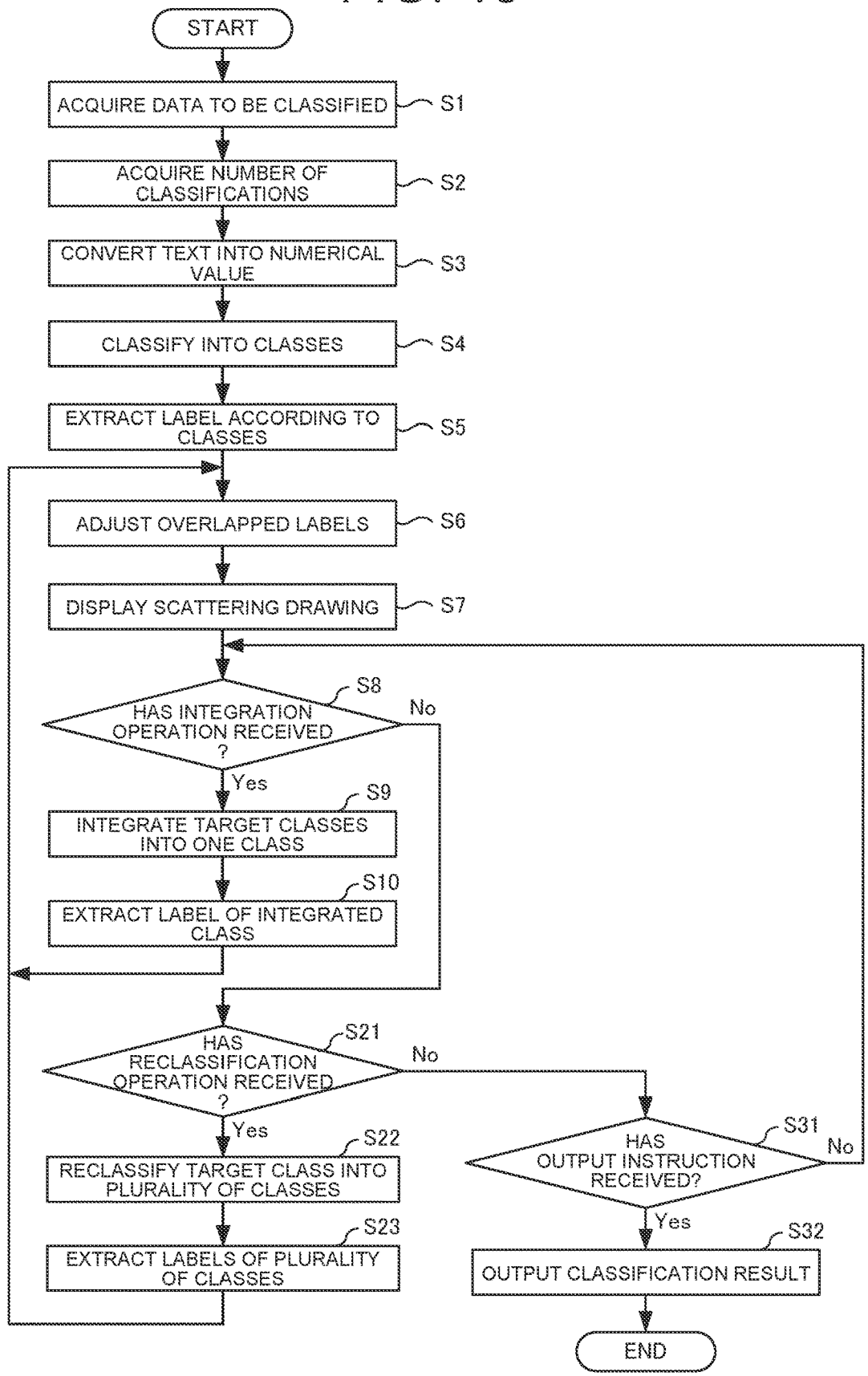
FIG. 15 is a flowchart for illustrating an example of the procedure of data classification processing executed in the information processing system according to the embodiment of the present disclosure.

Hereinafter, an example of the procedure of the data classification processing executed in the information processing system 10 will be described with reference to FIG. 15.

Note that the present disclosure can be regarded as a data classification method (corresponding to an information processing method of the present disclosure) of executing one or a plurality of steps included in the data classification processing. Further, the one or a plurality of steps included in the data classification processing described here may be omitted as appropriate. Furthermore, the execution sequence of each of the steps in the data classification processing may differ as long as the same effect and advantage can be obtained. Additionally, in the example described here, the controller 11 of the management server 1 executes each step in the data classification processing; however, in another embodiment, one or a plurality of processors may decentrally execute each step in the data classification processing.

First, in step S1, the controller 11 acquires text data to be classified. For example, when the user selects the text data to be classified on the operation screen P1 illustrated in FIG. 3, the controller 11 acquires the text data from the storage 12.

Next, in step S2, the controller 11 acquires the number of classifications. For example, when the user selects the number of classifications on the operation screen P1 illustrated in FIG. 3, the controller 11 acquires the number of classifications.

Next, in step S3, the controller 11 performs numerical transformation on the text data into vector data by using a natural language model. Specifically, the controller 11 performs numerical transformation processing on the text data by using a known natural language model to transform the text data into, for example, 768 dimensional vector data.

Next, in step S4, the controller 11 classifies the text data into classes. Specifically, the controller 11 executes, based on the vector data, classification processing of classifying the text data into the number of classes selected by the user, by using a known clustering method.

Next, in step S5, the controller 11 extracts a label (feature element) for each of the classified classes. For example, the controller 11 extracts, for each class, top five words (label candidates) in descending order of appearance frequency from a plurality of text data included in the class. Here, one label includes five words. The controller 11 assigns the extracted label to each class.

Next, in step S6, the controller 11 adjusts the display of the overlapping labels. Specifically, the labels at least partially overlap each other when the labels are displayed in the scattering diagram P2. In such a case, the controller 11 reduces the number of displayed words (label candidates) in each of the labels. Note that when no overlapping label exists, the controller 11 skips the processing of step S6 and shifts to step S7.

Next, in step S7, the controller 11 displays the scattering diagram P2 (classification map). Specifically, the controller 11 generates two-dimensional vector data for drawing a scattering diagram by performing known dimensional compression processing on the vector data. Then, the controller 11 generates the scattering diagram P2 based on the classification data of the plurality of classes to which the labels are assigned and on the two-dimensional vector data, and displays the generated scattering diagram P2 on the user terminal 2 (see FIGS. 5 and 13).

Next, in step S8, the controller 11 determines whether an integration operation for integrating classes has been received from the user. For example, when the user selects the labels R1 and R2 in the scattering diagram P2 displayed on the user terminal 2 and presses "Integrate" (see FIGS. 6 and 7), the controller 11 receives the integration operation. When the integration operation is received (S8:Yes), the controller 11 shifts the processing to step S9. When the integration operation is not received (S8:No), the controller 11 shifts the processing to step S21.

In step S9, the controller 11 executes integration processing of integrating the plurality of classes selected by the user into one class. Here, the controller 11 integrates the class corresponding to the label R1 and the class corresponding to the label R2 into one class.

Next in step S10, the controller 11 extracts the label of the integrated class. For example, in the scattering diagram P2, the controller 11 extracts one label Ra (five words representing features) based on the text data of the two classes corresponding to the labels R1 and R2. After step S10, the controller 11 shifts the processing to step S6.

Returning to step S6, when the overlapping labels exist, the controller 11 performs processing of reducing the number of displayed words in the label based on the text data after the classes are integrated. Additionally, in step S7, the controller 11 displays the label Ra corresponding to the integrated class in the scattering diagram P2 (see FIG. 8). As just described, when receiving the integration operation from the user, the controller 11 integrates the classes and updates the scattering diagram P2.

Meanwhile, in step S21, the controller 11 determines whether a reclassification operation of reclassifying the class has been received from the user. For example, when the user selects the label R7 in the scattering diagram P2 displayed on the user terminal 2, selects the number of classifications on the screen Pb, and presses "Reclassify" (see FIG. 10), the controller 11 receives the reclassification operation. When the reclassification operation is received (S21:Yes), the controller 11 shifts the processing to step S22. When the reclassification operation is not received (S21:No), the controller 11 shifts the processing to step S31.

In step S22, the controller 11 reclassifies one class selected by the user into a plurality of classes. Here, the controller 11 reclassifies the class corresponding to the label R7 into two classes.

Next, in step S23, the controller 11 extracts a label for each of the reclassified classes. For example, in the scattering diagram P2, the controller extracts two new labels R71 and R72 based on the text data of the class corresponding to the label R7. After step S23, the controller 11 shifts the processing to step S6.

Returning to step S6, when the overlapping labels exist, the controller 11 performs processing of reducing the number of displayed words in the label based on the text data after the class is reclassified. Additionally, in step S7, the controller 11 displays the labels R71 and R72 corresponding to the reclassified classes in the scattering diagram P2 (see FIG. 11). As just described, when receiving the reclassification operation from the user, the controller 11 reclassifies the class and updates the scattering diagram P2.

In step S31, the controller 11 determines whether an instruction to output the classification result has been received from the user. For example, when the user issues an output instruction in the scattering diagram P2, the controller 11 receives the output instruction. When the output instruction is received (S31:Yes), the controller 11 shifts the processing to step S32. Meanwhile, when the output instruction is not received (S31:No), the controller 11 shifts the processing to step S8.

In step S32, the controller 11 outputs the classification result to the user terminal 2. For example, as illustrated in FIG. 14, the controller 11 allows the user terminal 2 to display, based on the scattering diagram P2, the classification result P3 in which the text data and the label are associated with each other.

After step S32, the controller 11 ends the data classification processing. The controller 11 can execute the data classification processing in parallel each time a classification instruction is acquired from each user terminal 2.

As described above, the information processing system 10 according to the present embodiment acquires a plurality of text data to be classified, classifies the plurality of acquired text data into a plurality of classes (groups, categories), extracts a label (feature element) representing a feature of a class for each of the plurality of classified classes, and generates the scattering diagram P2 (classification map) in which the extracted label is displayed in association with the class. In addition, the information processing system 10 receives a predetermined operation (integration operation, reclassification operation) of selecting a label from the user in the scattering diagram P2, executes processing of changing (integrating, classifying) the class based on the label selected by the user, and updates the scattering diagram P2.

For example, when a first label and a second label are selected by the user, the information processing system 10 integrates the first class corresponding to the first label and the second class corresponding to the second label, extracts a third label corresponding to a class after integration based on first text data included in the first class and second text data included in the second class, and generates the scattering diagram P2 (see FIGS. 6 to 8).

In addition, for example, when the first label is selected by the user, the information processing system 10 reclassifies the first class corresponding to the first label into a plurality of classes, extracts new labels respectively for the plurality of reclassified classes, and updates the scattering diagram P2 (see FIGS. 10 and 11).

According to the configuration described above, the user confirms the labels classified in the scattering diagram P2 of the text data to be classified, and when the classification result of the labels is not what the user intends and makes it difficult to figure out the tendency of the text data, the user can update the scattering diagram P2 by integrating the classes or reclassifying the class. As a result, an appropriate label (feature element) based on the overall tendency of the text data can be assigned.

The information processing system 10 according to the present embodiment may be configured as follows. Specifically, the information processing system 10 is a system that automatically classifies a large amount of text data and performs data editing after presentation and classification of auxiliary information for label determination by the user. Further, the scattering diagram in which the classified text data is two-dimensionally quantified and drawn by color for each class, a feature element formed of frequently appearing words of each class, and the like are used as the auxiliary information. Furthermore, by selecting a class from the displayed scattering diagram, the user can perform data editing such as integration and reclassification on the selected class.

Specifically, the information processing system 10 includes a storage data base for text data, an automatic classification unit, a feature element extraction unit, a numerical transformation unit, and a scattering diagram display, classifies a large amount of text data, provides a user with a scattering diagram and a feature element of each class as auxiliary information for label determination, stores and outputs a classification label input by the user based on the auxiliary information and text information associated with the classification label. Further, in addition to the configuration described above, by selecting a class from the scattering diagram to the text data after classification, the information processing system 10 performs data editing such as integration or reclassification on the selected class. Furthermore, in the configuration described above, the information processing system 10 extracts a feature element for the classification class after editing and displays the feature element. In addition, when the classification class is finely divided and thus the respective feature elements are displayed in an overlapping manner, the information processing system 10 adjusts the feature elements to be displayed and thereby prevents the overlapping display. Moreover, in the configuration described above, the information processing system 10 includes a correction unit, and corrects editing when the editing is different from the user's intention.

In the conventional service, when a large amount of text data is input, only textual information including the classified text data, frequently appearing words, and the like is output. In contrast, in the present embodiment, the classified text data, textual information including frequently appearing words and the like, and two-dimensionally quantified text data are displayed in a scattering diagram. By quantifying the text and drawing the quantified text in the scattering diagram, the similar meaning between data and the distribution of groups can be visualized, and the user can figure out the data tendency more accurately than in the related art and assign an appropriate classification label.

In the aforementioned present embodiment, the management server 1 alone corresponds to the information processing system of the present disclosure, but the information processing system of the present disclosure may be configured by the user terminal 2 alone. In this case, for example, a data classification application is installed in the user terminal 2, and the user terminal 2 executes the functions of the aforementioned management server 1 (the functions of the acquisition processing unit 111, the display processing unit 112, the classification processing unit 113, the reception processing unit 114, the update processing unit 115, and the output processing unit 116). Additionally, the information processing system of the present disclosure may be configured by combination of the management server 1 and the user terminal 2.

Note that the information processing system of the present disclosure can also be applied to a system that manages information on conference minutes.

ADDITIONAL NOTES OF DISCLOSURE

Hereinafter, a summary of the disclosure extracted from the aforementioned embodiment will be appended. Note that the configurations and processing functions appended and described below can be selected and combined arbitrarily.

Additional Note 1

An information processing system comprising:
an acquisition processing circuit that acquires a plurality of pieces of data to be classified;
a classification processing circuit that classifies the plurality of pieces of data acquired by the acquisition processing circuit into a plurality of groups, extracts a feature element representing a feature of a group for each of the plurality of classified groups, and generates a classification map in which the feature element is displayed in association with the group;
a reception processing circuit that receives an operation of selecting the predetermined feature element in the classification map from a user; and
an update processing circuit that executes processing of changing the group based on the feature element selected by the user and updates the classification map.

Additional Note 2

The information processing system according to Additional Note 1, wherein when a first feature element and a second element are selected by the user, the update processing circuit integrates a first group corresponding to the first feature element and a second group corresponding to the second feature element, extracts a third feature element corresponding to a group after integration based on first data included in the first group and second data included in the second group, and updates the classification map.

Additional Note 3

The information processing system according to Additional Note 2, wherein when the first group and the second group are not similar to each other, the update processing circuit rejects update processing of the classification map or displays warning information.

Additional Note 4

The information processing system according to any one of Additional Notes 1 to 3, wherein when a first feature element is selected by the user, the update processing circuit reclassifies a first group corresponding to the first feature element into a plurality of groups, extracts a new feature element for each of the plurality of reclassified groups, and updates the classification map.

Additional Note 5

The information processing system according to Additional Note 4, wherein the update processing circuit receives an operation of selecting the number of classifications into which the first group is reclassified from the user, and reclassifies the first group into the number of classifications selected by the user.

Additional Note 6

The information processing system according to any one of Additional Notes 1 to 5, wherein the classification processing circuit extracts the feature element including one or a plurality of words representing the feature of the group, and
further when a first feature element and a second feature element that are extracted overlap each other in the classification map, the classification processing circuit reduces the number of displayed words included in each of the first feature element and the second feature element.

Additional Note 7

The information processing system according to any one of Additional Notes 1 to 6, wherein the data and the feature element are output in association with each other based on the classification map updated by the update processing circuit.

Additional Note 8

The information processing system according to any one of Additional Notes 1 to 7, wherein the classification processing circuit executes classification processing of converting the data in a text format into vector data by a natural language model and classifying the data into the plurality of groups based on the vector data, and dimensional compression processing of compressing the data into two-dimensional data, generates a scattering diagram corresponding to the classification map by the classification processing and the dimensional compression processing, and displays the feature element in a selectable manner in the scattering diagram.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing system comprising:
one or more processors configured to:
acquire a plurality of pieces of data to be classified,
create a classification map in which the plurality of pieces of data is plotted,
classify the plurality of pieces of data into a plurality of groups, and extract feature elements representing group features for respective groups in the plurality of groups,
generate a scattering diagram corresponding to the classification map based on a plurality of pieces of vector data into which the plurality of pieces of data has been converted, and display the feature elements for the respective groups in a selectable manner in the scattering diagram,
receive an operation of selecting a predetermined one of the feature elements from a user on the feature elements displayed on the scattering diagram,
execute processing of changing a group, among the respective groups, based on the predetermined one of the feature elements selected by the user, and
update the scattering diagram.

2. The information processing system according to claim 1, wherein, when a first feature element and a second feature element are selected by the user, the one or more processors are further configured to:
integrate a first group corresponding to the first feature element and a second group corresponding to the second feature element,
extract a third feature element corresponding to a group after the integration based on first data included in the first group and second data included in the second group, and
update the scattering diagram.

3. The information processing system according to claim 2, wherein, when the first group and the second group are not similar to each other, the one or more processors are further configured to:
reject update processing of the scattering diagram, or display warning information.

4. The information processing system according to claim 1, wherein, when a first feature element is selected by the user, the one or more processors are further configured to:
reclassify a first group corresponding to the first feature element into a plurality of reclassified groups,
extract a new feature element for each of the plurality of reclassified groups, and
update the scattering diagram.

5. The information processing system according to claim 4, wherein the one or more processors are further configured to:
receive an operation of selecting a number of classifications into which the first group is reclassified from the user, and
reclassify the first group into the number of classifications selected by the user.

6. The information processing system according to claim 4, wherein
the reclassification is rejected when a distance between the new features, in a case of the reclassification into the plurality of reclassified groups, is less than a predetermined distance.

7. The information processing system according to claim 1, wherein the one or more processors are further configured to extract the feature elements including one or more words representing the group features, and
when a first feature element and a second feature element that are extracted overlap each other in the scattering diagram, the one or more processors are further configured to reduce a number of displayed words included in each of the first feature element and the second feature element.

8. The information processing system according to claim 1, wherein the plurality of pieces of data and the feature elements are output in association with each other based on the updated scattering diagram.

9. The information processing system according to claim 1, wherein the one or more processors are further configured to:
execute classification processing of converting the plurality of pieces of data in a text format into the plurality of pieces of vector data by a natural language model and classifying the plurality of pieces of data into the plurality of groups based on the plurality of pieces of vector data, and execute dimensional compression processing of compressing the plurality of pieces of data into a plurality of pieces of two-dimensional data, and
generate the scattering diagram by the classification processing and the dimensional compression processing.

10. The information processing system according to claim 1, wherein
when a first feature element and a second feature element are selected by the user, the one or more processors are further configured to:
update the scattering diagram by merging a first group corresponding to the first feature element and a second group corresponding to the second feature element when a distance between the first feature element and the second feature element in the scattering diagram is less than a predetermined distance, and
reject the merging of the first group and the second group when the distance between the first feature element and the second feature element in the scattering diagram is equal to or greater than the predetermined distance.

11. An information processing method executed by one or more processors,
the information processing method comprising:
acquiring a plurality of pieces of data to be classified;
creating a classification map in which the plurality of pieces of data is plotted;
classifying the plurality of pieces of data into a plurality of groups, and extracting feature elements representing group features for respective groups in the plurality of groups;
generating a scattering diagram corresponding to the classification map based on a plurality of pieces of vector data into which the plurality of pieces of data has been converted, and displaying the feature elements for the respective groups in a selectable manner in the scattering diagram;
receiving an operation of selecting a predetermined one of the feature elements from a user on the feature elements displayed on the scattering diagram;
executing processing of changing a group, among the respective groups, based on the predetermined one of the feature elements selected by the user; and
updating the scattering diagram.

12. A non-transitory computer-readable recording medium in which an information processing program is recorded,
the information processing program causing one or more processors to execute:
acquiring a plurality of pieces of data to be classified, creating a classification map in which the plurality of pieces of data is plotted, classifying the plurality of pieces of data into a plurality of groups, and extracting feature elements representing group features for respective groups in the plurality of groups, generating a scattering diagram corresponding to the classification map based on a plurality of pieces of vector data into which the plurality of pieces of data has been converted, and displaying the feature elements for the respective groups in a selectable manner in the scattering diagram, receiving an operation of selecting a predetermined one of the feature elements from a user on the feature elements displayed on the scattering diagram, executing processing of changing a group based on the predetermined one of the feature elements selected by the user, and updating the scattering diagram.

* * * * *